Jan. 17, 1950   W. A. SWANK   2,494,594
AUDIO FATIGUE UNIT
Filed Nov. 16, 1944
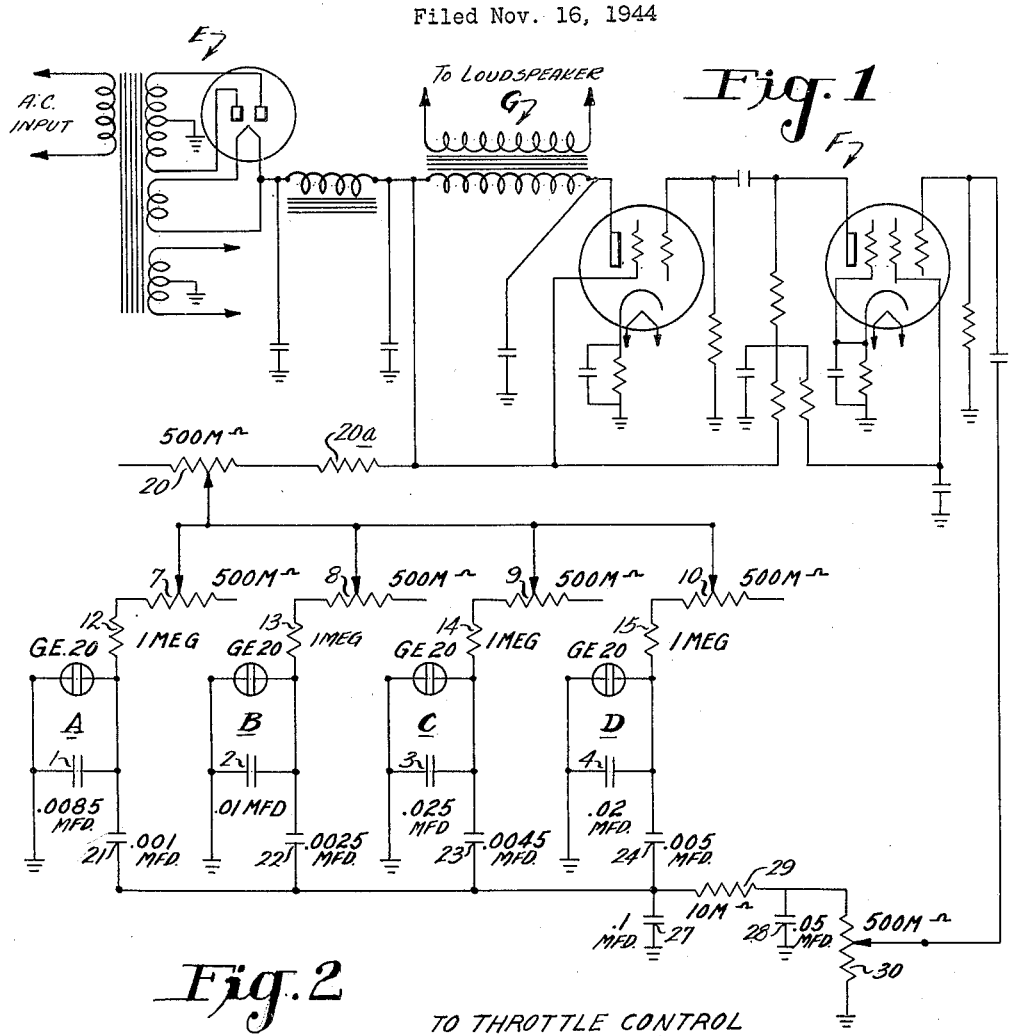
INVENTOR.
WILBERT A. SWANK Patented Jan. 17, 1950

2,494,594

UNITED STATES PATENT OFFICE 2,494,594

AUDIO FATIGUE UNIT

Wilbert A. Swank, Dayton, Ohio

Application November 16, 1944, Serial No. 563,741

5 Claims. (Cl. 35—12)

(Granted under the act of March 3, 1883, as amended April 30, 1928; 370 O. G. 757)

The invention described herein may be manufactured and used by or for Government for governmental purposes, without the payment to me of any royalty thereon.

This invention relates to devices for simulating the noise of airplane engines and is intended for use in conjunction with pilot training devices, such as the Link-type trainer, for the purpose of subjecting a prospective pilot to the noise fatigue which would ordinarily be occasioned in operating an airplane in actual flight.

It is an object of my invention to provide an electrical appliance for realistically simulating the noise of an airplane having one or more engines, at various simulation speeds, and it is a further object to provide means whereby simulated changes in throttle conditions or propeller pitch will automatically vary certain electrical elements of the appliance thereby producing a change in sound realistically similar to the change in sound that would be experienced in actual flight.

In the attainment of these objects, I utilize a plurality of relaxation oscillator circuits, each of which is capable of providing oscillations of a fundamental frequency and various harmonics thereof. The plurality of circuits are coupled together producing a beat frequency which is amplified and transformed into sound waves. By selecting appropriate values of capacity and resistance in each oscillator circuit and in various electrical control elements forming part of my appliance, I am enabled to obtain an audio ouput realistically simulating the sound of an airplane having one or more engines, as desired. Further, by mechanically interlinking the pilot's controls with certain variable elements of my appliance, a sound effect is obtained which realistically corresponds to the sound effect which would be obtained by manipulation of identical controls in actual flight.

A more detailed description of my invention now follows with reference to the appended drawings in which:

Fig. 1 shows a symbolic electrical circuit thereof; and

Fig. 2 illustrates a pilot training device and a greatly enlarged plan view of the adjustable controls of the aircraft engine electronic noise producing appliance with simulation throttle and propeller pitch controls mechanically connected to the adjustable controls of the electronic appliance as indicated in broken lines for simplicity and clearness of the invention.

With reference to the drawings, a plurality of four relaxation oscillator circuits are shown designated as A, B, C, and D. A conventional power supply source E is utilized to power the oscillators A, B, C, and D, and a conventional audio amplifier F is provided to amplify the mixed output of the oscillator circuits, the amplified output then being connected through an output transformer G to a loud speaker or a pair of earphones (not shown). Particular attention is now called to the oscillator circuits A, B, C, and D, each of which comprises a glow discharge tube in the form of a one-quarter watt neon bulb, specifically designated for use in conjunction with the capacitance and resistance values disclosed herein as the type known commercially as a G. E. 20. Capacitors 1, 2, 3, and 4 are shunted across the neon bulbs of circuits A, B, C, and D, respectively, and variable resistances 7, 8, 9, and 10 in series with fixed resistances 12, 13, 14, and 15 are connected to corresponding sides of each of the neon bulbs, as shown. Resistances 7, 8, 9, and 10 have a common connection to a variable resistance 20 in series with a resistance 20a which govern the potential impressed on the oscillator circuits by the power supply E. Capacitors 21, 22, 23, and 24 are in series with corresponding sides of the oscillator circuits A, B, C, and D, respectively, and provide coupling to a low pass filter system comprising capacitors 27, 28, and resistance 29. A variable resistance 30 is provided in series with the output from the oscillator circuits to the amplifier F.

In order to obtain a practical range of realistic simulation of airplane noises satisfactory values of resistances and capacitors have been found to be as follows:

Capacitors 1, 2, 3, and 4 have a value of .0085 mfd.; .01 mfd.; .025 mfd.; and .02 mfd., respectively.

Variable resistances 7, 8, 9, 10, 20, and 30 each have a maximum value of five hundred thousand ohms.

Resistances 12, 13, 14, and 15 each have a value of one megohm.

Capacitors 21, 22, 23, and 24 have a value of .001 mfd.; .0025 mfd.; .0045 mfd.; and .005 mfd., respectively.

Capacitors 27 and 28 have a value of .1 mfd. and .05 mfd., respectively, and resistance 29 has a value of ten thousand ohms.

In operation, each oscillator circuit generates oscillation frequencies and harmonics thereof in accordance with its circuit constants. Since the circuit constants are all different, a variety of fundamental frequencies and harmonics thereof will be produced. The oscillations are mixed by coupling the output voltages of each oscillator to a common output circuit through capacitors 21, 22, 23 and 24, respectively. This output circuit contains all of the fundamental frequencies plus the harmonic content of each oscillator and numerous beat frequencies resulting from the fundamental and harmonic frequencies of each oscillator modulating the outputs of all the other oscillators. This is due to the fact that all the oscillators are connected in parallel, and the load presented to the parallel combination by each oscillator varies at the frequency of that oscillator due to the gas tube alternately becoming conductive and nonconductive. The resulting output voltages encounter the low pass filter comprising capacitors 27 and 28 and resistance 29, and then passes through the attenuator or volume control 30 to the amplifier F. The purpose of the low pass filter is to proportion the amount of fundamental frequencies and harmonic content in the resultant oscillatory mixture so as to cut off any audio frequencies not naturally present in airplane sound. The fundamental frequencies of each of the oscillator circuits A, B, C, and D may be individually varied by means of the variable resistances 7, 8, 9, and 10, respectively, and the overall output may be varied as to pitch and quality by means of the variable resistance 20, governing the voltage impressed on the circuits, the lower the adjusted resistances the higher the overall frequencies. Further, the inherent instability of relaxation oscillators causes some fundamental frequency drift in each circuit which effect variations in beat frequencies corresponding very realistically with the sound attendant actual flight.

The resistor 20a is largely responsible for the continually varying quality of sound output of the device and functions as follows:

When two or more oscillators drift into synchronization, the condensers of these oscillators start charging simultaneously. The current drain from the D. C. supply, drawn through resistor 20a becomes larger, causing a voltage drop across the resistor that is greater than would be the case were the oscillators not near synchronization. The voltage applied to the oscillators is therefore reduced an equal amount. The other components of the oscillator circuits are such that an equal drop in D. C. voltage produces an unequal change in frequency thereby causing the oscillations to drift out of synchronization. The cycle repeats at a varying rate, and, accordingly, all four oscillators vary in frequency at a random, unpredictable rate, due to the varying D. C. applied to them and the device produces sounds realistically simulating airplane noises for this reason.

The value of the resistor 20a should be such that a drop of approximately fifty volts occurs therein for proper results, and, of course, such value depends on the voltage output of the power supply, the glow discharge tubes being operated at rated voltage.

By means of variable resistances 7, 8, 9, 10, 20, and 30, a great variety of sound characteristics can be obtained, for instance, sound effects similar to those heard in a single engine plane may be obtained by adjusting resistances 7, 8, 9, and 10 so as to synchronize oscillation of their respective circuits. Changes in R. P. M. may be simulated by varying resistances 20 and 30 to correspondingly vary the pitch and volume, respectively, of the beat frequency. Sound effects of multi-engine airplanes may be obtained by adjusting two of the oscillators slightly out of synchronism, e. g., on 55 cycles per second, and adjusting a third on 60 cycles per second, and a fourth on 180 cycles per second. This combination of adjustments produces the sound of a multi-engine airplane flying with engines very slightly out of synchronism. The effects thus obtained by varying the resistances 7, 8, 9, and 10 coupled with the different frequency drift rates of the oscillators produce the constantly varying hum and sound effects which are characteristic of actual flight.

In order to automatically obtain aircraft flight sound effects corresponding to changed conditions of flight, the variable resistances may be of the rotary arm type and be mechanically coupled to appropriate controls of the training device. For example, as shown in Fig. 2, the throttle control 35 of a training device 36 may be connected to the variable resistances 20 and 30 by means of a link 40 connected to a common bar 41. Accordingly, a simulation increase or decrease in throttle opening actuates the variable resistance 20 to correspondingly increase or decrease the output frequency of the oscillators whereas varying resistance 30 correspondingly increases or decreases the volume of sound. Similarly, linkage systems 43 and 44 may be utilized to mechanically connect resistances 9 and 10 to propeller pitch controls 46 and 47, the effect being to vary the frequencies of the circuits C and D to correspond to the sound effect produced by a combination of various degrees of propeller pitch of a multi-engine airplane.

It is apparent that the appliance disclosed herein is not limited to the production of aircraft noises, but by selection of circuit constants and glow discharge tubes differing from the present teaching only in electrical values, a variety of sound effects may be realized, all in accordance with the principles involved and within the scope of my invention and I claim:

1. In an appliance for producing sound, a plurality of relaxation oscillator circuits each including a discharge tube wherein each circuit generates oscillations of a different fundamental frequency and harmonics thereof, means providing a common potential impressed on the said oscillator circuits, a fixed resistance included in said means operative to prevent synchronization in the oscillator circuits by producing unequal change in frequency for an equal drop in potential, a variable resistance included in said means between said fixed resistance and said oscillator circuits to vary the potential impressed on all the oscillator circuits for varying the respective fundamental frequencies of oscillation thereof, variable resistance means in each relaxation oscillator circuit for individually varying the potential impressed on its discharge tube to individually vary the oscillation thereof, said variable resistance means of the oscillator circuits having a common connection with the variable resistance of the first mentioned means, and means for mixing the oscillations from said circuits to produce a beat frequency.

2. An appliance for simulating the sound of a multi-engine aircraft comprising in combination, a power source, a plurality of relaxation oscillator circuits, conductor means for coupling said power source to said circuits providing a common potential thereon, a variable resistance in said conductor means for varying the common potential to change the oscillation frequencies in all the said oscillator circuits, a fixed resistance in the said conductor means between the variable resistance and the power source for preventing synchronization in the oscillator circuits by producing unequal change in frequency for an equal drop in potential, means for mixing the oscillations from said oscillator circuits to produce a beat frequency, and means for linking a simulation throttle control of a pilot-training device to said variable resistance whereby a simulated throttle change is operative to produce sound waves having corresponding characteristics.

3. An appliance for simulating the sound of a multi-engine aircraft comprising in combination, a power source, a plurality of relaxation oscillator circuits, conductor means for coupling said power source to said circuits providing a common potential thereon, a variable resistance in said conductor means for varying the common potential to change the oscillation frequencies in all the said oscillator circuits, a fixed resistance in the said conductor means between the variable resistance and the power source for preventing synchronization in the oscillator circuits by producing unequal change in frequency for an equal drop in potential, means for mixing the oscillations from said oscillator circuits to produce a beat frequency, variable means for controlling the volume of sound from the appliance, and means linking said volume control means and said variable resistance means to the simulation throttle of a pilot-training device whereby a simulated throttle change is operative to produce sound waves having characteristics corresponding to a throttle change.

4. An appliance for simulating the sound of a multi-engine aircraft comprising in combination, a power source, a plurality of relaxation oscillator circuits, conductor means for coupling said power source to said circuits providing a common potential thereon, a variable resistance in said conductor means for varying the common potential to change the oscillation frequencies in all the said oscillator circuits, a fixed resistance in the said conductor means between the variable resistance and the power source for preventing synchronization in the oscillator circuits by producing unequal change in frequency for an equal drop in potential, means for mixing the oscillations from said oscillator circuits to produce a beat frequency, means in each circuit for varying the oscillation frequency thereof, and means for linking one or more of said last-named means to simulation propeller pitch controls of a pilot-training device whereby simulated changes in propeller pitch are operative to effect changes in sound wave characteristics corresponding thereto.

5. An appliance for simulating the sound of a multi-engine aircraft comprising in combination, a power source, a plurality of relaxation oscillator circuits, conductor means for coupling said power source to said circuits providing a common potential thereon, a variable resistance in said conductor means for varying the common potential to change the oscillation frequencies in all the said oscillator circuits, a fixed resistance in the said conductor means between the variable resistance and the power source for preventing synchronization in the oscillator circuits by producing unequal change in frequency for an equal drop in potential, means for mixing the oscillations from said oscillator circuits to produce a beat frequency, variable means for controlling the volume of sound from the appliance, means linking said volume control means and said variable resistance means to the simulation throttle of a pilot-training device, means in each oscillator circuit for varying the oscillation frequency thereof, means for linking one or more of said last-named means to simulation propeller pitch controls of the pilot-training device whereby simulated throttle changes and simulated propeller pitch changes are operative to effect changes in sound wave characteristics corresponding thereto.

WILBERT A. SWANK.

REFERENCES CITED

The following references are of record in the file of this patent:

UNITED STATES PATENTS

| Number | Name | Date |
| --- | --- | --- |
| 1,994,902 | Trouant | Mar. 19, 1935 |
| 2,040,439 | Langer | May 12, 1936 |
| 2,140,840 | Langer et al. | Dec. 20, 1938 |
| 2,233,948 | Kock | Mar. 4, 1941 |
| 2,252,189 | Langer | Aug. 12, 1941 |
| 2,354,699 | Owens | Aug. 1, 1944 |
| 2,369,418 | St. John | Feb. 13, 1945 |